United States Patent [19]
Geary

[11] Patent Number: 4,764,680
[45] Date of Patent: Aug. 16, 1988

[54] METHOD OF AND ARRANGEMENT FOR TESTING CYLINDRICAL OBJECTS FOR SHAPE DEVIATIONS

[75] Inventor: Joseph M. Geary, Jupiter, Fla.

[73] Assignee: United Technologies Corporation, Hartford, Conn.

[21] Appl. No.: 38,076

[22] Filed: Apr. 14, 1987

[51] Int. Cl.$^4$ ............................................. G01V 9/04
[52] U.S. Cl. .................................... 250/560; 356/361
[58] Field of Search ............... 250/571, 560, 561, 572; 356/361, 73.1, 349, 239, 73

[56]     References Cited
    U.S. PATENT DOCUMENTS

| | | | |
|---|---|---|---|
| 3,953,128 | 4/1976 | Holly | 356/349 |
| 4,565,449 | 1/1986 | Grego | 356/361 |
| 4,571,082 | 2/1986 | Downs | 356/361 |
| 4,711,574 | 12/1987 | Baldwin | 356/361 |

Primary Examiner—David C. Nelms
Assistant Examiner—Jessica Ruoff
Attorney, Agent, or Firm—Peter R. Ruzek

[57]    ABSTRACT

An arrangement for testing a cylindrical object, which may be constituted either by a reflective or refractive element capable of focusing collimated light into a focal line or by an elongated filament, employs cooperation of the element and of the filament, with a laser beam directed onto the element. The filament, especially an optical fiber, extends along the focal line of the element, so that a portion of the laser beam aimed at the element and focused thereby into a waist region extending along the focal line and thus onto the filament, is reflected back to the element and recollimated thereby for travel back along the path of the original laser beam, whereupon the return light beam is caused to interfere with the original laser beam and thus to provide an interferogram that can then be evaluated to obtain information about the magnitude and location of any deviations of the object being tested from its ideal shape.

18 Claims, 2 Drawing Sheets

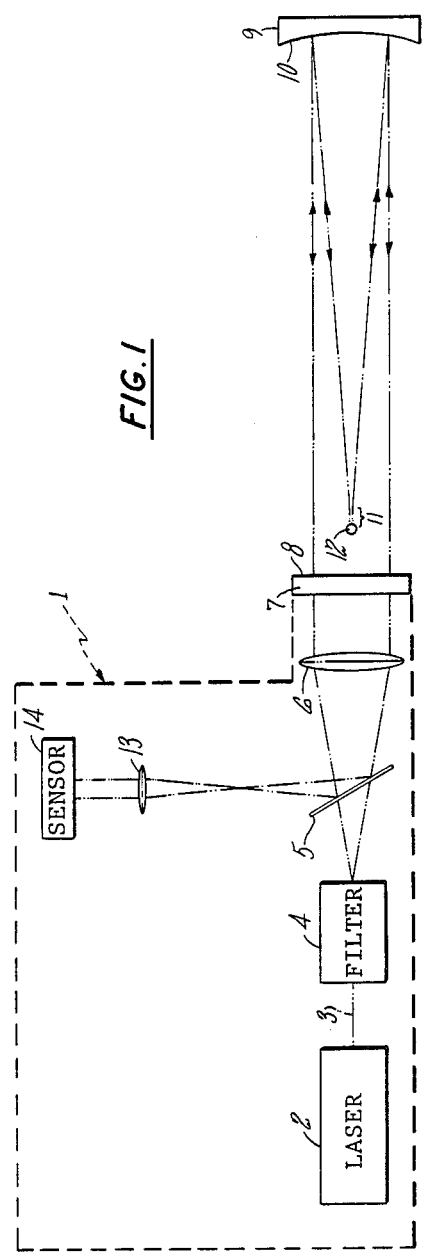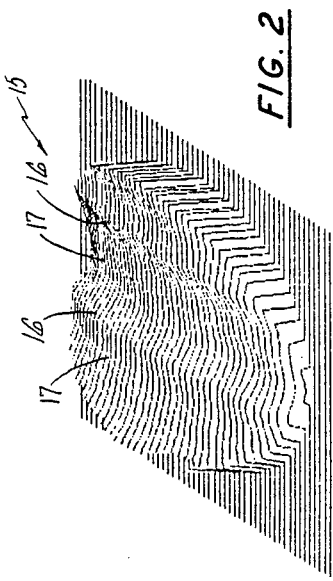

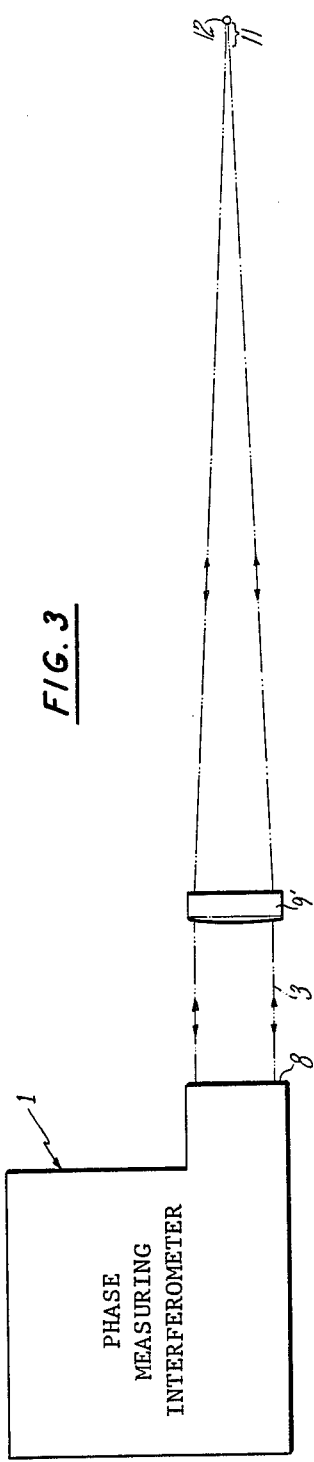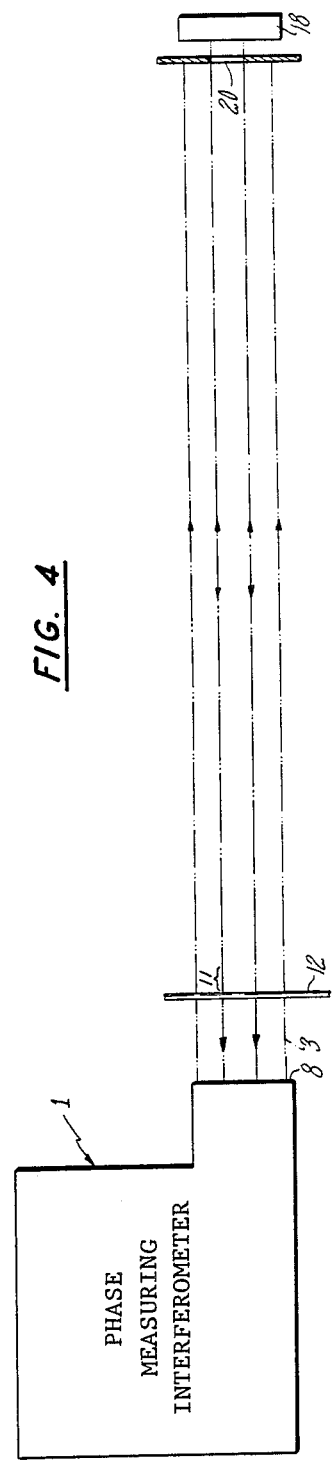

METHOD OF AND ARRANGEMENT FOR TESTING CYLINDRICAL OBJECTS FOR SHAPE DEVIATIONS

DESCRIPTION

1. Technical Field

The present invention relates generally to testing cylindrical optics, and more particularly to methods of and arrangements for testing cylindrical reflective or refractive objects such as cylindrical concave mirrors, collecting lenses and filaments, especially optical fibers, for deviations from their ideal cylindrical shapes.

2. Background Art

Testing cylindrical optics has always presented a significant challenge to the metrologist. Technical literature in this area is relatively sparse. The principal difficulty in making an interferometric evaluation of a cylinder is the lack of a good cylindrical reference surface which is well characterized. The use of a flat as a retroreflecting reference is hampered by beam inversions. This is particularly serious for asymmetric surface errors in the cylindrical optical object since it causes difficulty in or even impossibility of identifying the source of the problem. Another approach, which may be used particularly during fabrication, is to use a test plate. But this provides only a relative measure between surfaces not well characterized in themselves. Thus, it may be seen that the approaches used heretofore for testing cylindrical reflective objects for shape accuracy, and consequently the shape accuracy itself which can be obtained when using the known testing methods and arrangements, leave much to be desired.

Accordingly, it is an object of the present invention to avoid the disadvantages of the prior art.

More particularly, it is an object of the present invention to provide a method of testing cylindrical reflective or refractive objects for deviations from their ideal cylindrical shapes.

It is yet another object of the present invention to devise a method of the above type which renders it possible to obtain a heretofore unachievable accuracy in determining the magnitudes and locations of any deviations of the actual shapes of the cylindrical objects being tested from their ideal shapes.

Still another object of the present invention is to develop the above method in such a manner as to be particularly suited for testing concave cylindrical mirrors, cylindrical collecting lenses and elongated filaments, especially optical fibers.

A concomitant object of the invention is to present a testing apparatus which is particularly suited for the performance of the above method.

It is a further object of the present invention to construct the apparatus of the type here under consideration in such a manner as to achieve a high degree of accuracy in determining the testing results.

DISCLOSURE OF THE INVENTION

The above objects and others which will become apparent hereafter are accomplished in accordance with the present invention by utilizing the cooperation of a cylindrical reflective or refractive element capable of focusing collimated light into a focal line and of an elongated filament, one of which is the object to be tested while the other provides a reference surface, with a laser beam in such a manner that the filament, especially an optical fiber, extends along the focal line of the cylindrical reflective or refractive element, so that a portion of the laser beam aimed at the element and focused thereby into a waist region extending along the focal line and thus onto the filament, is reflected back to the element and recollimated thereby for travel back along the path of the original laser beam, whereupon the return light beam is caused to interfere with the original laser beam and thus provide an interferogram that can then be evaluated to obtain information about the magnitude and location of any deviations of the object being tested from its ideal shape.

BRIEF DESCRIPTION OF THE DRAWING

The present invention will be described in detail below with reference to the accompanying drawing in which:

FIG. 1 is a diagrammatic top plan view of a testing arrangement according to the present invention as used for testing a cylindrical mirror;

FIG. 2 is an illustration of an optical path difference map obtained by evaluating an interference pattern generated during the operation of the arrangement of FIG. 1;

FIG. 3 is a view similar to FIG. 1, but of a testing arrangment as used for testing a cylindrical lens; and FIG. 4 is a diagrammatic side elevational view of a testing arrangement as used for testing a filament.

BEST MODE FOR CARRYING OUT THE INVENTION

Referring now to the drawing in detail, and first to FIG. 1 thereof, it may be seen that the reference numeral 1 has been used therein to identify a testing interfometer. The interferometer 1 can be of any known construction, but it is illustrated as being constructed as a Fiszeau interferometer, such as that currently available on the market under the designation ZYGO Mark III phase measuring interferometer.

The illustrated interferometer 1 includes a laser 2 which emits a laser beam 3 from one of its ends. After leaving the laser 1, the laser beam 3 is spatially filtered in a filter device 4 and then propagates through a beam filter 5 to a collimating lens 6 where it is collimated and directed through a reference plate 7 having a reference surface 8 toward a cylindrical object which is to be tested and which is constituted in the arrangement of FIG. 1 by a cylindrical mirror 9 having a reflection surface 10. The reflection surface 10 of the cylindrical mirror 9 then reflects the laser beam and, because of its cylindrical configuration, concentrates or focuses the reflected laser beam toward a waist region that is indicated at 11 and extends along a focal line of the cylindrical mirror 9.

A filament 12, especially an optical fiber having a reflective outer surface, is situated at and extends along the focal line. The filament 12 has a diameter which is at least equal to but preferably exceeds the width of the waist region 11 as considered in a focal plane that includes the focal line and extends transversely to the direction of propagation of the laser beam 3. The reflective surface of the filament 12 then reflects a portion of the laser light back to the reflective surface 10 of the cylindrical mirror with a wavefront that, for reasons that will be obtained in more detail later, is substantially cylindrical. The reflective surface 10 of the cylindrical mirror 9 then recollimates the reflected laser light, and this recollimated laser light then propagates back to the reference surface 8 of the reference plate 7, where it is combined with a portion of the original laser beam 3 that is reflected from the reference surface 8. The combined light beam then proceeds to the beam split 5 which reflects a portion of this combined beam to another collimating lens 13 and through the same toward a sensor 14 where the interference pattern resulting from the combination of the return laser light beam with the original laser light beam is perceived.

The present invention is based on the recognition of and utilization of the fact that, in modern optical fibers, which are finding an ever widening role in the communications industry, one parameter affecting performance is cross-sectional stability (diameter) as a function of length. The cross-sectional configuration of the optical fiber must be held within very tight limits during the drawing process since otherwise the optical losses of the fiber during its use for transmitting light in its longitudinal direction can be quite dramatic. The fiber is drawn from a preform at a rate of several meters per second. Since the drawing is a flow process, it is unlikely that the diameter would change significantly over sub-meter lengths. It is, therefore, possible to use the external surface of the fiber (the cladding surface) as a reasonably accurate cylindrical reference surface in the interferometric arrangement described above where the fiber 12 is placed coincident with the focal line of the concave cylindrical mirror 8. By using the testing arrangement of FIG. 1, it is possible to test rather large concave cylindrical mirrors (14" square) to previously unrealistic accuracies. The fiber 12 offers a very cost effective means of doing so.

As already alluded to before, in the interferometric configuration for testing the cylinder 12 as shown in FIG. 1, the collimated beam 3 (which may have, for instance, a 4" diameter) from the phase measuring interferometer 1 strikes the cylinder 8 under test which converges the beam 8 to the aforementioned focal line. At the focal line, and coincident with it, is located the fiber 12 acting as the optic reference. The fiber 12 operates on-axis with essentially no central obscuration. A fraction of the incident light is returned toward the cylinder 8 which then recollimates the wavefront and sends it back into the interferometer 1. There the returning wavefront combines with a reference wavefront generated internally within the interferometer 1 in the manner described above.

The resulting interferogram may be merely displayed for analysis. However, it is currently preferred to construct the sensor 14 in such a manner as to be able to generate electrical signals that are representative of the fringe pattern of the interferogram, such as by using a TV camera, and to utilize such electrical signals for displaying the fringe pattern on a TV monitor. These electrical signals may then be also used, in a well-known manner, for evaluating the fringe pattern to form a representation of the actual shape of the reflection surface 10 of the mirror 8 or of the deviations of such actual shape from the ideal cylindrical shape of the surface 10. A computer running a fringe analysis code, such as that known as the WISP fringe analysis code, can be used to process these electrical signals and, if so desired, to provide a display or printout, such as that shown in FIG. 2 of the drawing. This approach to the evaluation of fringe patterns is so well known that it will not be addressed here in any more detail. It will be appreciated that in FIG. 2 the raised central area 15 corresponds to the illuminated area of the reflective surface 10 of the mirror 9 and that the ridges 16 and the valleys 17 of the area 15 correspond, in a highly exaggerated and yet proportional manner, to the raised and depressed portion of the illuminated area of the reflective surface 10 of the mirror 9. Thus, there is obtained a visual representation of the deviations of the actual shape of the affected area of the surface 10 from the ideal shape thereof, and this information can then be used, after the entire surface 10 has been evaluated in this manner, to correct these deviations by machining or the like.

FIG. 3 shows that the same approach may be used for an application where the cylindrical object to be tested is a cylindrical lens 9'. In this case, the laser beam 3 issued by the interferometer 1, is directed against the cylindrical lens 9' and passes therethrough to be focused into a waist region 11 extending along a focal line of the lens 9'. The optical fiber or similar filament 12 is located along the focal line and is at least coextensive with the waist region 11, so that a portion of the laser light reaching the fiber 12 is reflected back to the lens 9' and is recollimated thereby prior to reaching the reference surface 8 of the interferometer 1. Thereafter, the resulting interference pattern may be evaluated in the manner discussed above.

The optical fiber, as it comes from the manufacturer, is enclosed in a plastic jacket. This protective coating is acquired during the drawing process. It is not normally expected to be removed when the fiber is to be used as a optical waveguide (except for short sections during slicing). However, for the purposes of the present invention, 10-15 inches of plastic coating material are removed (with a special tool that leaves the underlying glass surface undamaged). The bare fiber is then strung across a special fixture to deposit a thin film reflective coating thereon. The coating must be uniform; therefore, the fixture rotates the fiber about its longitudinal axis during the formation of the coating. The coated fiber is then stretched across a special mount which allows one axis of tilt plus in plane rotation (for clocking purposes). The fiber ends are epoxied in place. One end is attached to a spring mount through which an adjustable tension is applied. The fiber must operate under tension to avoid bowing which would adversely affect the quality of the cylinder test interferometry. The fiber is now ready to be qualified.

An arrangement for qualifying the fiber 12 in subsequent use in testing cylindrical reflective objects is shown in FIG. 2. A cylindrical examining mirror 18 is masked by a rectangular aperture card 19 having an aperture 20 such that only a waist region corresponding to a short segment of the focal line corresponding to the full aperture 20 is formed. However, the length of the rectangular aperture mask 19 and of the aperture 20 as considered transversely to the plane of FIG. 4 is matched to the size of the cylinder 9 or of the line 9' to be tested. This short focal line is coincident with, and the light focused thereon by the mirror 18 through the aperture 20 effectively illuminates, a segment of the fiber 12. In the monitor of the phase modulation interferometer 1 there may be seen a rectangular interferogram after final alignment adjustments are made. This interferogram is nulled out, and a phase modulation evaluation mode of the phase modulation interferometer 1 is activated. Collected optical path difference data is then transferred to an external computer containing the WISP fringe analysis code. Several data sets are averaged. This average is stored for later use. The fiber 12 is then translated along its length through the width of the aperture mask, i.e., the next adjacent segment is set up for analysis. An average is obtained here. Now, the first data set obtained and stored is subtracted from the subsequent data set. The residual optical path difference map is characteristic of the difference between the adjacent segments of the fiber 12. The effects of the examining cylinder 18 and of the common fiber parameters are removed. It is also to be noted that the quality of the examining cylinder 18 in the region defined by the aperture mask 19 is not critical, and need not be known. The entire length of the fiber 12 is characterized by repeated application of the process. The first stored data set is always subtracted from all data sets. Peak-to-valley and root mean square phase are calculated for each residual. A 6" length of Corning 1517 fiber may be evaluated using a 7.5"×1" aperture mask. This particular fiber would be useful for testing cylinders up to 7.5"×6" (with curvatures running in the 7.5" direction). In general, surface errors to $\pm\mu/20$ can be detected. It is also contemplated to use this approach for monitoring the diameter of an optical fiber in optical applications, such as during the formation of the optical fiber.

The operation of the interferometer arrangement shown in FIG. 1 is somewhat subtle. The sensitivity of a measurement is usually dependent on the number of passes through the optic under test. If the Fizeau interferometer were used for examining a nominally flat mirror, there would be a single reflection off the mirror. However, the wavefront "sees" the surface deformation twice: once before reflection and once afterwards. Consequently, the fringes appearing in the interferogram, which are the result of interfering test and reference wavefronts, would show twice the surface error. In FIG. 1, the light reflects off the cylinder surface 10 two times. Normally, this would mean the test wavefront picked up to four times the surface error. Yet, this is not the case when using the fiber 12.

What one observes after the beam from the test mirror 9 strikes the fiber 12 is a band of light 360° about the fiber 12, having the same width as the fiber length being illuminated. An explanation of this is as follows. The fiber 12 is located at a diffractive, not a geometric, focus. Since a laser source 2 is used in the interferometer 1, the focus lies within the Rayleigh range. Furthermore, within this so-called waist region 11, the beam 3 is nominally collimated. The interaction between the beam 3 and the fiber 12 in this region 11 is geometric despite the diffractive realm within which it occurs. Only a small portion of the incoming light field from the mirror 9 actually returns to the cylinder after interacting with the fiber 12.

The wavefront from the interferometer 1 picks up twice the surface deformations inherent in the full aperture of the test mirror. However, only a narrow fraction and highly smoothed version of this deformation is returned to the mirror 9. In other words, the first pass through the test mirror 9 essentially illuminates the fiber 12 which, in turn, generates a cylindrical reference wavefront. This new reference wavefront returns to the mirror 9, picks up twice the surface error, is recollimated, returns to the interferometer 1 and reacts with the local laser reference at the reference surface 8 to generate the resulting interference pattern. The sensitivity of this pattern is equivalent, then, to the case of the flat mirror discussed earlier.

The wavefront disturbance picked up after the first pass of the test mirror 9 is very weakly coupled to the wavefront heading back for a second encounter after interacting with the fiber 12. Nonetheless, some perturbation gets through that corrupts the quality of the cylindrical reference wavefront. This perturbation can be determined as follows: The half angle subtended by the mirror 9 having a focal length of 246.13 centimeters and a transverse dimension of 19.04 centimeters as considered from the fiber location is 2.22°. A geometric ray trace code (FALCON) can be used to identify a ray incident on the fiber 12 having a diameter of 178 $\mu$m at a point space by 0.606 $\mu$m from the center as the one incident at 1.11° and hence reflected at 2.22°. This identifies a linear strip on the fiber 1.2 $\mu$m wide that is responsible for returning light back to the test mirror 9. To determine what kind of aberration across the pupil of the mirror 9 under test could make use of this microscopic region to couple into the second pass, an initial approach may be employed, using the concept of a phase grating across the surface of a perfect cylindrical mirror. For convenience, the functions of the grating and imaging properties are separated To find out what spatial frequency $\mu_o$ in the grating locates the first interference order at the 0.606 micron location on the fiber 12 it is to be considered that the amplitude transmission in Plane 1 for a unit incident plane wave in given by:

$$t(x_1) = \exp\left\{ i\frac{m}{2} \sin(2\pi\nu X_1) \right\} \text{rect}\left(\frac{x_1}{b}\right)$$

The intensity in the far field is given by:

$$I(x_3) = \left(\frac{b^2}{\lambda f}\right)^2 \sum_{q=-\infty}^{\infty} J_q^2\left(\frac{m}{2}\right) \text{sinc}^2\left\{\frac{b}{\lambda f}(x_3 - q\nu_o f\lambda)\right\}$$

The displacement of the q th interference order from the center is given by:

$x_3 = q\nu_o \lambda f$

Let
  q=1
  f=246 cm
  $\lambda$=0.6328 $\mu$m (6.328×10$^{-5}$ cm)
  $x_3$=0.6×10$^{-4}$ cm
Therefore:
  $\nu_o$=0.0038 cm$^{-1}$
  and $\lambda_o$=260 cm A 19 cm wide cylindrical mirror represents only a small fraction of $\lambda_o$. The maximum phase variation that can be expected over a 19 cm width as determined by postulating, for convenience:

$$t_1 = e^{i\phi}$$

where $\phi = \phi \sin 2\dfrac{x_1}{\lambda_o}$

The 19 cm width is let to fall in the region of the grating where phase change is greatest.
  Let $x_1 = \pm 9.5$ cm So that $\sin 2\pi \dfrac{130 \pm 9.5}{260} = \pm 0.2276$ Therefore, $\phi = \pm(0.2276)\phi$
Let $\phi = \pi$ (For a 1λ P-V excursion)

Therefore, the maximum, or worst case phase excursion that can be expected over a 19 cm mirror width is 1.43 radians or 0.23 (peak-valley). This phase variation across the pupil is practically linear and would look like a tilt effect which is easily removed. Since it is not expected that any strong non-linear phase would couple across into the second pass, it appears that the quality of the fiber 12 alone determines the quality of the cylindrical reference wavefront.

Using a qualified, 14" long fiber 12, a 4" diameter area of a 4.5 inch square cylinder (R=200") was tested using the arrangement of FIG. 1. The fiber mount was bolted to a lateral translation (slide) stage that had a 6 inch range of travel. This allowed motion through the width of the beam 3. In this way, two independent data sets from two distinct and separate sections of the fiber 12 could be collected. Each data set was an average of five individual subsets obtained via the phase measuring interferometer 1. The subset optical path difference maps were passed on to an external computer containing the WISP fringe analysis code, where averaging took place. A summary of the collected data for one of the data sets is presented in FIG. 2. Tilt and focus terms were removed from the displays.

Before exiting this section, it is to be pointed out that, in spite of operating in a somewhat noisy environment (optical fabrication and machine shops in the general vicinity) the fringe pattern obtained using the 14 inch long fiber 12 (under tension) was very stable. In other words, the fiber 12 was not vibrating significantly. The experiment was done on an NRC 24' air isolated optical table. The total round trip air path over which the measurement on the cylinder was conducted was approximately 18 feet. Air turbulence was controlled by shrouding the working area on the table thereby sealing it off from the rest of the metrology lab.

It has been shown that an optical fiber is a viable approach to testing cylindrical optics. This becomes even more attractive as the cylinders become large. The mode of operation, and qualification procedures were discussed. The fiber 12 being currently used is capable of measuring a cylindrical surface to an accuracy of 0.1λ. This refers to the ability to measure the Seidel terms.

It should be understood that the invention is not limited to the particular embodiment shown and described herein, but that various changes and modifications may be made without departing from the spirit and scope of this concept as defined by the following claims.

I claim:

1. An arrangement for testing an optical cylindrical optical element, which is capable of focusing collimated light toward a focal line situated in a focal plane, for deviations of its actual shape from its ideal cylindrical shape, comprising:
   means for directing a collimated beam of laser light against the optical element for focusing thereby toward an elongated waist region extending along the focal line and having a predetermined width at the focal plane;
   an elongated cylindrical filament including at least a longitudinal portion coextensive with said waist region, and having a reflective surface for reflecting a portion of the laser light reaching the same with a substantially cylindrical wave front back to the optical element being tested for recollimation thereby and travel back towards said directing means as a substantially collimated return beam of light having a wave front indicative of the actual shape of the mirror; and
   means for forming an interference pattern between said beams of light for evaluating the influence of the deviations on said wave front of said return light beam.

2. The arrangement as defined in claim 1, wherein said filament has a diameter at least substantially corresponding to said predetermined width.

3. The arrangement as defined in claim 2, wherein said diameter exceeds said predetermined width.

4. The arrangement as defined in claim 1, wherein said filament is substantially centered on said focal line.

5. The arrangement as defined in claim 1, wherein said filament is an optical fiber.

6. The arrangement as defined in claim 5, wherein said optical fiber has a reflective outer coating providing said reflective surface.

7. The arrangement as defined in claim 1, wherein the element is a concave mirror.

8. The arrangement as defined in claim 1, wherein the element is a collecting lens.

9. The arrangement as defined in claim 1, and further comprising means for examining the filament for conformity of its actual shape to its ideal shape, including a cylindrical examining element capable of focusing collimated light toward an auxiliary focal line parallel to and coextensive with a longitudinal zone of the filament, means for aiming a collimated examining beam of laser light at said examining element for focusing thereby toward said auxiliary focal line to form an examining waist region of a predetermined width at and extending along said auxiliary focal line and for reflection of a portion of the laser light reaching the reflective surface with a wave front indicative of any deviations of the actual shape from the ideal shape of the filament to said examining element for recollimation thereby and travel back towards said aiming means as a substantially collimated examining return beam of light, and means for forming an examination interference pattern between said examining beams of light for evaluating the influence of the deviations on said wave front of said examining return light beam.

10. The arrangement as defined in claim 9, wherein said examining means further includes a mask interposed between said examining element and said filament and masking said examining element except for a cylindrical strip of a predetermined axial width to axially delimit a section of the longitudinal zone of the filament which is being examined, and means for effecting relative movement between said mask and said filament parallel to said focal line for successively examining consecutive sections of said filament.

11. The arrangement as defined in claim 9, wherein said examining element is a concave examining mirror.

12. The arrangment as defined in claim 9, wherein said examining element is a collecting examining lens.

13. An arrangement for examining a filament having a reflective surface for deviations of its actual shape from its ideal shape, comprising:
   a cylindrical examining element capable of focusing collimated light toward a focal line parallel to and coextensive with a longitudinal portion of the filament;

means for directing a collimated beam of laser light against said examining element for focusing thereby toward said focal line to form a waist region of a predetermined width at and extending along said focal line and for reflection of a portion of the laser light reaching the reflective surface with a wave front indicative of the actual shape of the filament back to said examining element for recollimation thereby and travel back towards said directing means as a substantially collimated return beam of light; and means for forming an interference pattern between said beams of light for evaluating the influence of the deviations on said wave front of said return light beam.

14. The arrangement as defined in claim 13; and further comprising a mask interposed between said examining element and the filament and masking said examining element except for a cylindrical strip of a predetermined axial width to axially delimit a section of the longitudinal portion of the filament which is being examined; and means for effecting relative movement between said mask and the filament parallel to said focal line for successively examining consecutive sections of the filament.

15. The arrangement as defined in claim 13, wherein said element is a concave mirror.

16. The arrangment as defined in claim 13, wherein said element is a collecting lens.

17. A method of testing a cylindrical element, which is capable of focusing collimated light toward a focal line, for deviations of its actual shape from its ideal cylindrical shape, comprising the steps of:

directing a collimated beam of laser light along a predetermined path against the element for focusing thereby toward a focal line to form a waist region of a predetermined width at and extending along the focal line;

positioning an elongated cylindrical filament having a reflective surface in such a manner that at least a longitudinal portion thereof is coextensive with said waist region for reflecting a portion of the laser light reaching the reflective surface with a substantially cylindrical wave front back to the element being tested for recollimation thereby and travel back along the predetermined path as a substantially collimated return beam of light having a wave front indicative of the actual shape of the element; and forming an interference pattern between the beams of light for evaluating the influence of the deviations on the wave front of the return light beam.

18. A method of testing a filament having a reflective surface for deviations of its actual shape from its ideal shape, comprising the steps of:

directing a collimated beam of laser light along a predetermined path against a cylindrical element capable of focusing light toward a focal line parallel to and coextensive with a longitudinal portion of the filament for reflection from the element toward the focal line to form a waist region of a predetermined width at and extending along the focal line and for reflection of a portion of the laser light reaching the reflective surface with a wave front indicative of the actual shape of the filament back to the element for recollimation thereby and travel back substantially along the predetermined path as a substantially collimated return beam of light; and forming an interference pattern between said beams of light for evaluating the influence of the deviations on the wave front of the return light beam.

* * * * *